April 27, 1965  J. M. BYNUM  3,180,386
INSERT WITH COLLAPSIBLE LOCKING PORTION
Filed Jan. 24, 1962
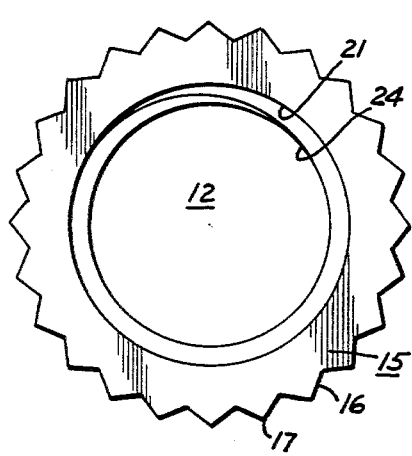
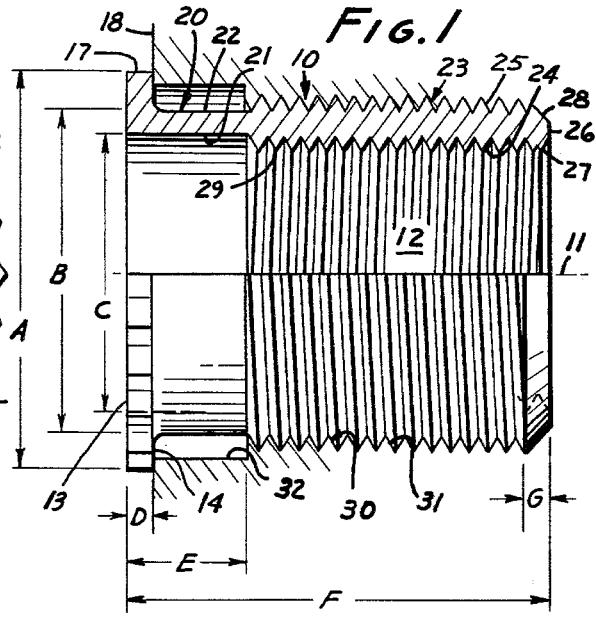
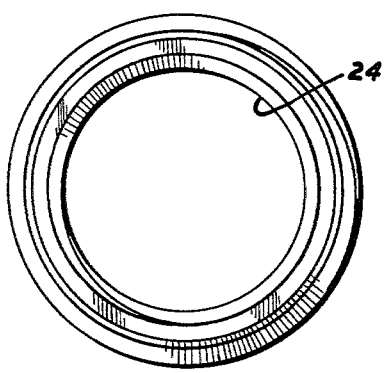
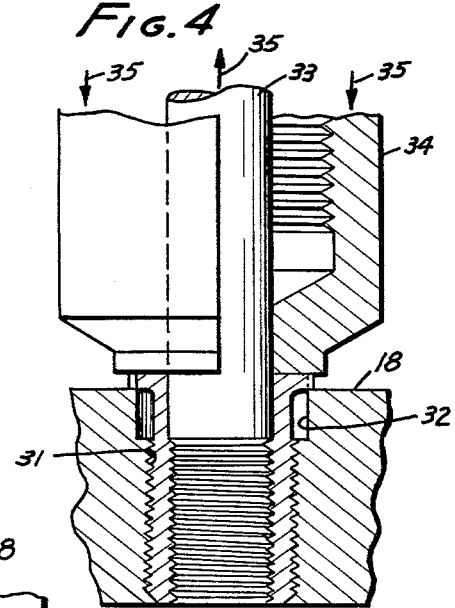
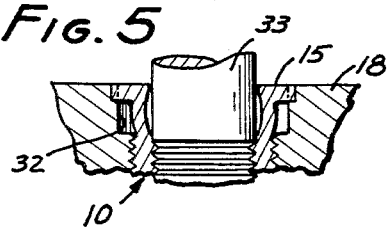
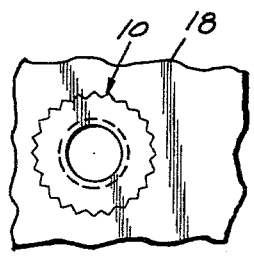
INVENTOR.
JERRY M. BYNUM
BY
ATTORNEYS.

United States Patent Office 3,180,386
Patented Apr. 27, 1965

3,180,386
INSERT WITH COLLAPSIBLE LOCKING PORTION
Jerry M. Bynum, Torrance, Calif., assignor to Hi-Shear Corporation, Torrance, Calif., a corporation of California
Filed Jan. 24, 1962, Ser. No. 168,433
4 Claims. (Cl. 151—41.73)

This invention relates to an insert.

An object of this invention is to provide an insert which is readily insertable into an opening in an object, the insert being provided with means for holding it against rotation after insertion. An object of such an insert is to provide durable surfaces such as threads in an object which is relatively softer.

Inserts for this purpose are well known in the art but in general they involve difficulties in their insertion. For example, relatively hard steel inserts are known for use in softer iron, steel or aluminum plates. However, most conventional inserts require percussive force to insert or set them. Because often the object in which the insert is to be set is accurately jig bored it is undesirable to have to hammer the inserts into place.

Accordingly it is still another object of the invention to provide an insert which can readily be inserted into a hole, and thereafter by means of a squeeze type tool, be non-rotatably secured in the hole.

An insert according to this invention comprises a body which has a central axis and an axial opening extending into the body from a first end thereof. An internal thread is provided in said opening and an external thread is provided on the outside of the body. Both of these threads have portions which are spaced from the first end.

A flange with a non-circular periphery is disposed closer to the first end then either of the threads, and a tubular section is provided between the threads and the flange, whereby the insert may be threaded into an object by means of the external thread, and the first end of the insert may thereafter be compressively loaded relative to the second end of the body in order to collapse the tubular section and thus to press the flange into the material of the object where it serves to restrain the insert from rotation in the object. The insert then provides an internal non-rotating thread for use in attaching other threaded means to the object.

According to a preferred but optional feature of the invention, the non-circular periphery includes serrations, the preferable embodiment comprising axially extending splines.

The above and other features of this invention will be fully understood from the following detailed description and the accompanying drawings, in which:

FIG. 1 is a side view, partly in cut away cross-section, showing the presently preferred embodiment of the invention;

FIGS. 2 and 3 are left and right hand end views, respectively, of FIG. 1;

FIG. 4 shows the first step of the insertion of the insert of FIG. 1;

FIG. 5 is a side view, partly in cutaway cross-section, showing the insert installed; and FIG. 6 is a plan view of FIG. 5.

With initial reference to FIG. 1 an insert according to the invention is shown which comprises a body 10 preferably made of metal, stainless steel being an example of a strong material useful in this type of insert. The body is generally tubular, and has a central axis 11. An axial opening 12 extends into the body from first end 13 thereof. The opening need not extend entirely through the body, although that arrangement is shown and preferred.

Adjacent to the first end is a peripheral flange 14 with a non-circular periphery 15. As best shown in FIG. 2, the periphery is serrated by splines 16, which have axially extending sharp edges 17 for cutting into the wall of a hole in an object 18 in which the insert is to be installed.

A tubular section 20 with an inner and an outer wall 21, 22, respectively, is contiguous to the flange. These walls are coaxial.

On the opposite side of the tubular section from the flange is a threaded section 23 which includes an internal and an external thread 24, 25. The threads may be of the same axial extent, although this is not a limitation on the invention. If desired there could be more or fewer of either the internal or external threads.

When the opening extends all the way through the body to the second end 26, it is convenient to provide an internal and an external chamfer 27, 28.

The inner wall 21 of the tubular section is contiguous to the first end of the insert and may conveniently be formed by initially internally threading the body, and then counterboring from the first end to the desired axial extent. The diameter of the counterbore is substantially equal to the groove diameter of the internal thread, the diameter of the crests 29 of the internal thread being less than the diameter of the inner wall so that threaded means can be passed through the tubular section and threaded into the internal thread.

The insert is intended to be inserted into an object 18 of somewhat softer material. For example, an insert made of 17–4 PH stainless steel, Condition A, is readily adapted to be inserted in mild steel, cold rolled steel or aluminum objects, such as plates, in which strong durable threads are desired. The material of the object itself is inherently unable to provide such threads. Dimensions for a suitable insert made of stainless steel, 17–4 PH, Condition A, are as follows: (Inches)

A. .675, .670
B. .560, .556
C. .500
D. .040, .037
E. .200
F. .750
G. .040
Threads 24: ½–20UNF–3B
Threads 25: ⅝–18UNF–3A
Splines 16: Straight knurl, 30 t.p.i.,
Diameter along edges 17: .685, .680

Dimension A is the diameter of the flange before knurling.

The object which is to receive the insert has a hole 30 therein with an internal thread 31 which mates with the external thread of the insert. A counterbore 32 is formed with a diameter about equal to that of the bases of the splines so that the edges of the splines will dig into the metal of the object as they are drawn into the counterbore. Counterbore 32 preferably is about as long as outer wall 22.

The installation of this insert will be understood by reference to FIGS. 4–6. In FIG. 4 the initial step is shown in which the insert has been threaded into threads 31 until the underside of the flange bears against the top of the object. Next a mandrel 33 is threaded into the interal thread of the insert and a nose anvil 34 is pressed against the top side of the flange. Then relatively moving the mandrel and the anvil, as shown by arrows 35, compressively loads the first end of the insert relative to the second end, that is, the tubular section is placed under compression, and this collapses the tubular section as shown in FIG. 5.

The tubular section bows out into counterbore 32 in the object. This enables the flange to move downwardly into the object, and the splines cut their way into the metal. Being non-circular in cross-section, they thereafter prevent the insert from rotating relative to the object. The mandrel 33 may then be unthreaded from the insert and the insert is ready to receive other threaded means.

The mandrel and nose piece are readily manipulatable by any suitable manual, or fluid operated puller.

The invention provides a simply manufacturable insert, which is rugged, and whose installation can be carried out by threading it into a hole and exerting a squeeze action on it, whereupon it becomes a substantially integral part of the object in which it is fitted. It then provides durable threads for application of other threaded means.

This invention is not to be limited by the embodiment shown in the drawings and described in the description which is given by way of example and not of limitation, but only in accordance with the scope of the appended claims.

I claim:

1. An insert comprising a one-piece metal body having a central axis, an axial opening extending into the body from a first end thereof; a peripheral flange formed on said body at said first end, said flange having uniform thickness; a serrated periphery on said flange; a tubular section contiguous to the flange, said tubular section having smooth cylindrical inner and outer surfaces, both of said surfaces being coaxial to said central axis; a threaded section contiguous to the tubular section on the opposite side thereof from the flange, said threaded section including an internal and an external thread, the periphery of the flange projecting laterally beyond the outer radius of the tubular section, said tubular section having thickness and length related to each other and to said flange thickness in a manner which provides axial compressive collapse of said tubular section resulting in a radially outwardly bulging of said tubular section under an axial force applied to the full surface of said body and flange at said first end, and said tubular section thickness and length related to the thickness between roots of said internal and external threads to prevent thread failure before axial compressive collapse of said tubular section, whereby the insert may be threaded into an object by means of the external thread, and said tubular section may be compressively loaded through said flange to collapse the tubular section and thereby press the serrations of the flange into the material of the object, the insert thereby providing an internal, non-rotating thread for use in attaching other threaded means to the object.

2. An insert according to claim 1 in which the serrations are axially-extending splines.

3. In combination: an object having an internally threaded opening therein, said opening being counterbored adjacent to the open end of the opening, and an insert adapted to be threaded into said opening comprising: a one-piece metal body having a central axis, and an axial opening extending into the body from a first end thereof; a peripheral flange of uniform thickness formed on said body at said first end; a serrated periphery on said flange, said serrated periphery of larger diameter than said counterbore; a tubular section contiguous to the flange, said tubular sections having smooth cylindrical inner and outer surfaces, both of said surfaces being coaxial to said central axis; a threaded section contiguous to the tubular section on the opposite side thereof from the flange, said threaded section including an internal and an external thread, the periphery of the flange projecting laterally beyond the outer radius of the tubular section, said tubular section having thickness and length related to each other and to said flange thickness in a manner which provides axial compressive collapse of said tubular section resulting in a radially outwardly bulging of said tubular section under an axial force applied to the full surface of said body and flange at said first end, and said tubular section thickness and length related to the thickness between roots of said internal and external threads to prevent thread failure before axial compressive failure of said tubular section, whereby said tubular section will collapse under an axial force applied to said body and flange to seat said serrated periphery of said flange in said counterbore, the insert thereby providing an internal, non-rotating thread for use in attaching other threaded means to the object.

4. An insert according to claim 3 in which the serrated periphery includes axially-extending splines.

References Cited by the Examiner
UNITED STATES PATENTS

| 2,188,422 | 1/40 | Waner | 151—41.72 |
| 2,444,145 | 6/48 | Rosan | 151—41.73 |
| 2,984,279 | 5/61 | Rosan | 151—41.73 |

M. HENSON WOOD, JR., *Primary Examiner.*

CARL W. TOMLIN, *Examiner.*